Figure 1:
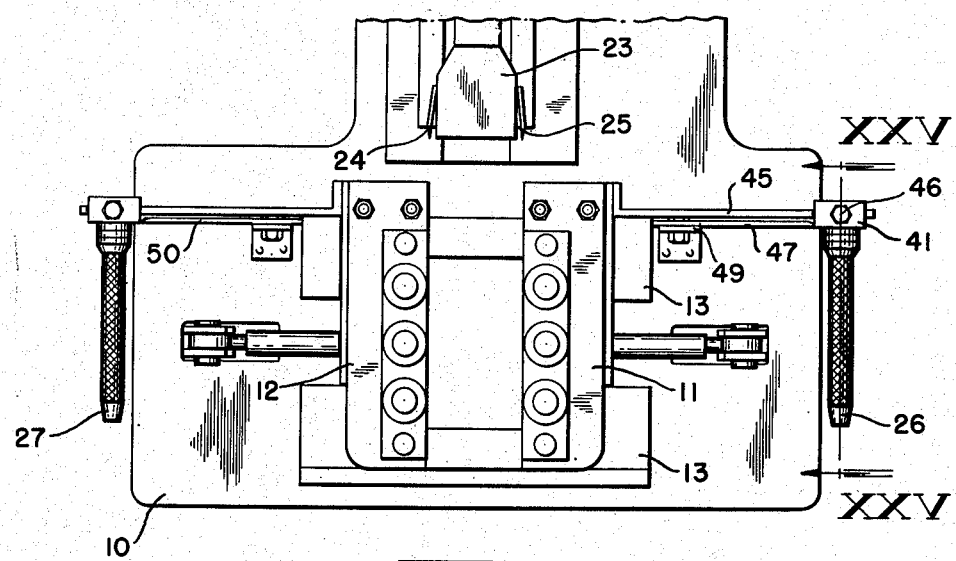

Nov. 24, 1953   A. B. CLAYTON ET AL   2,660,216
MACHINE FOR SPLICING RUBBER ARTICLES
Filed Oct. 23, 1951   8 Sheets-Sheet 3

INVENTOR.
ALFRED B. CLAYTON
THOMAS O. HALE
BY
ATTORNEY.

Nov. 24, 1953   A. B. CLAYTON ET AL   2,660,216
MACHINE FOR SPLICING RUBBER ARTICLES
Filed Oct. 23, 1951   8 Sheets-Sheet 4

INVENTOR.
ALFRED B. CLAYTON
BY THOMAS O. HALE

Irwin M. Lewis

ATTORNEY.

Nov. 24, 1953  A. B. CLAYTON ET AL  2,660,216
MACHINE FOR SPLICING RUBBER ARTICLES
Filed Oct. 23, 1951  8 Sheets-Sheet 5

INVENTOR.
ALFRED B. CLAYTON
BY THOMAS O. HALE

ATTORNEY.

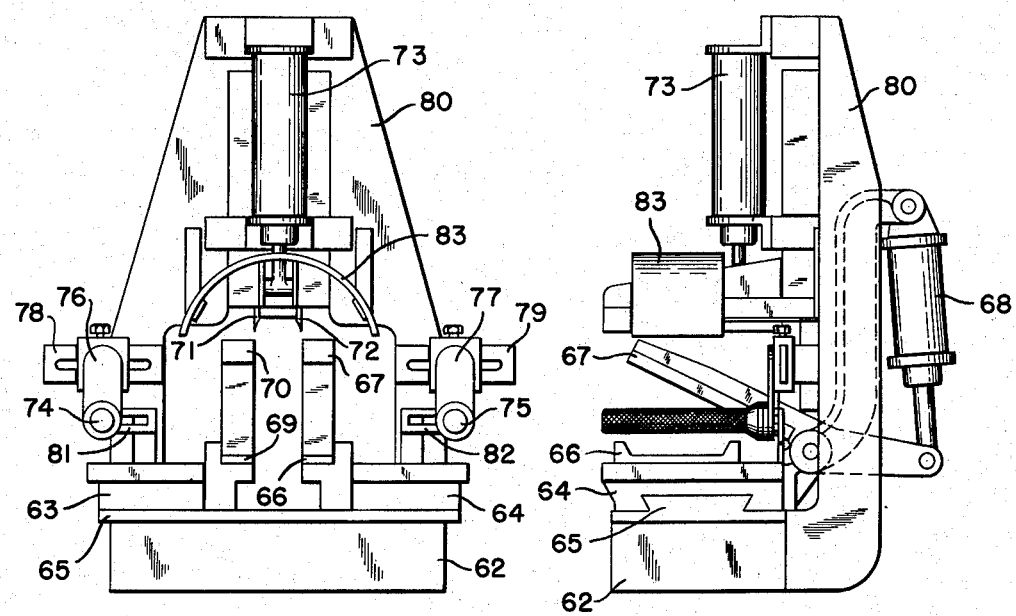
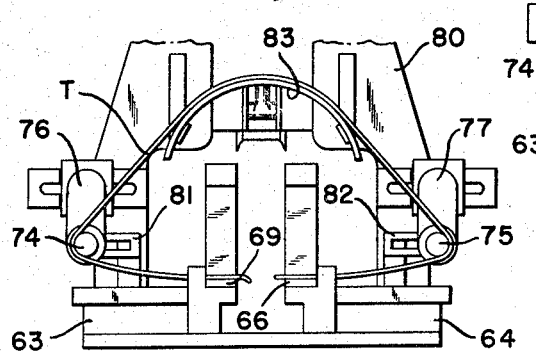
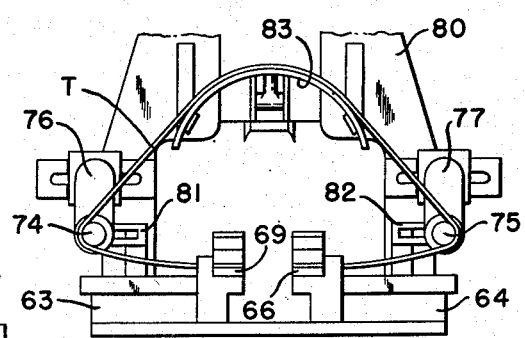

Nov. 24, 1953  A. B. CLAYTON ET AL  2,660,216
MACHINE FOR SPLICING RUBBER ARTICLES
Filed Oct. 23, 1951  8 Sheets-Sheet 8
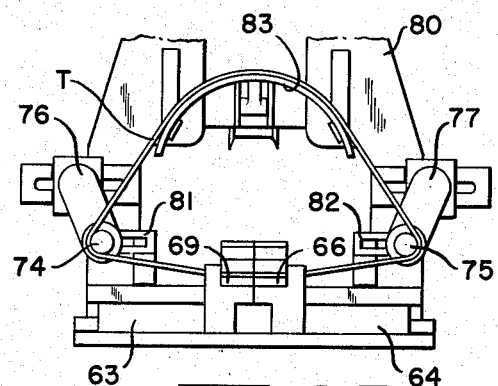
Fig. 23
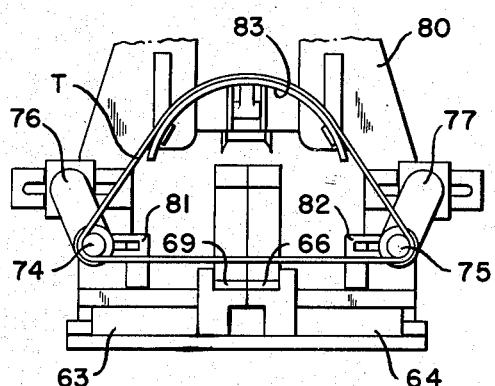
Fig. 24
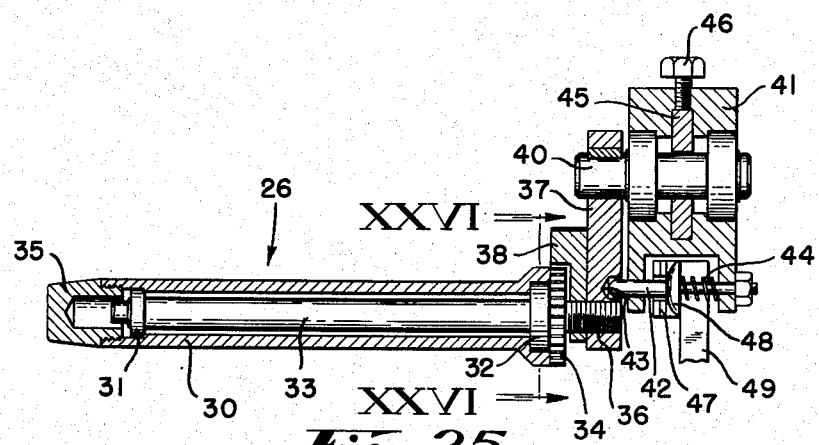
Fig. 25
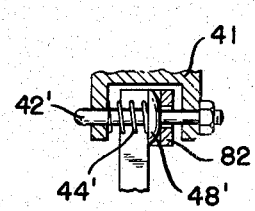
Fig. 27
Fig. 26
INVENTOR.
ALFRED B. CLAYTON
BY THOMAS O. HALE
ATTORNEY.

Patented Nov. 24, 1953

2,660,216

UNITED STATES PATENT OFFICE 2,660,216

MACHINE FOR SPLICING RUBBER ARTICLES

Alfred B. Clayton and Thomas O. Hale, Indianapolis, Ind., assignors to United States Rubber Company, New York, N. Y., a corporation of New Jersey Application October 23, 1951, Serial No. 252,722

6 Claims. (Cl. 154—9)

This invention relates to improvements in machines for splicing rubber articles and in particular it relates to improvements in a machine for joining together the ends of a length of tubular rubber stock to form an inner tube.

It is one object of the present invention to provide an improved splicing machine whereby a length of stock may be accurately gaged as it is placed in the machine so that it may be trimmed to a standard length before the ends are spliced together.

According to the invention, a standard splicing machine is provided with a plurality of spaced gaging points or surfaces. The spacing of the points or surfaces is such that the combined distance between them and the faces of the clamping jaws of the machine is equal to the desired trimmed length of the inner tube. When the length of tubular stock is placed in the machine, it is placed to correspond with the gage points or surfaces and the free ends are clamped in the clamping jaws of the machine. The excess material extending from the faces of the jaws is trimmed, leaving the desired standard length of stock.

Heretofore, the practice was to cut the stock to a length equal to the standard desired length plus a small excess for trimming. In placing the stock in the machine, the operator had to estimate the proper amount of the stock to be extended from the faces of the jaws to be trimmed. If he overestimated, the finished tube was shorter and therefore lighter than the desired standard. If he underestimated, the finished tube was longer and therefore heavier than the desired standard. Inner tubes, heretofore produced on standard machines were, therefore, often non-uniform both as to weight and length.

The present invention eliminates the possibility of error by the operator in placing the length of tube stock in the machine, inasmuch, as when the stock is placed in the machine to correspond to the gage points or surfaces and the ends clamped in the jaws of the machine, the tube will be accurately trimmed to the desired length.

Figure 2:
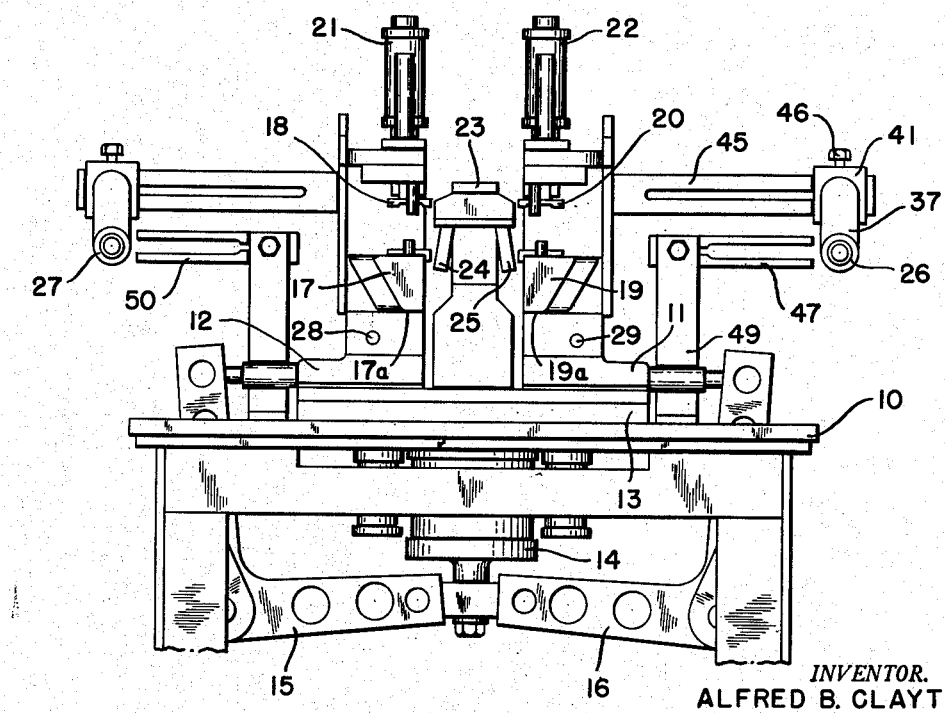
Figure 3:
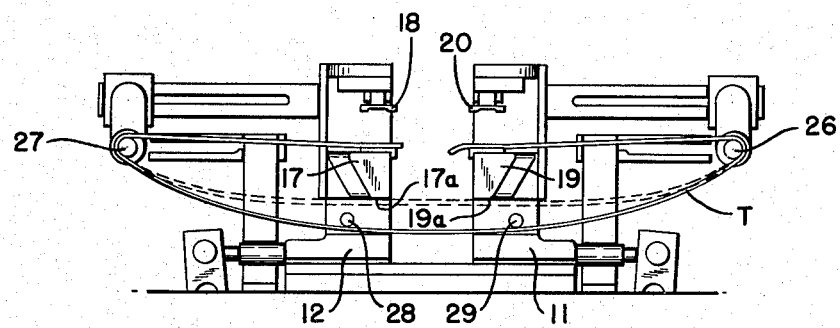
Figure 4:
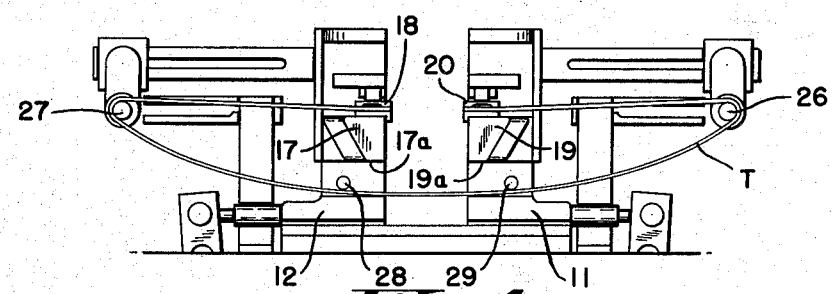
Figure 5:
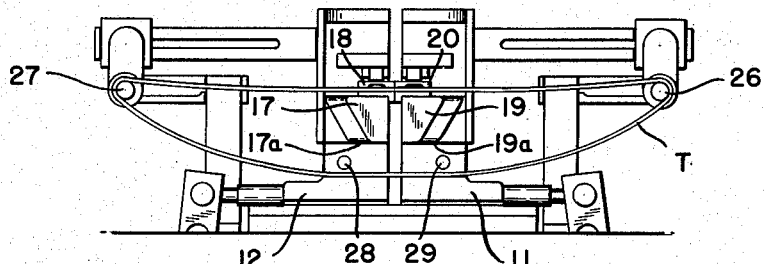
Figure 6:
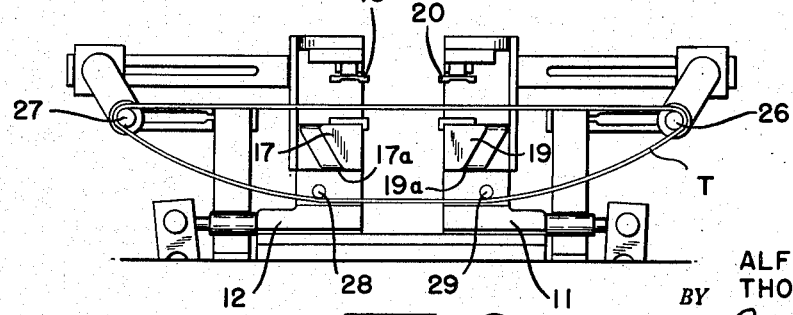
Figure 7:
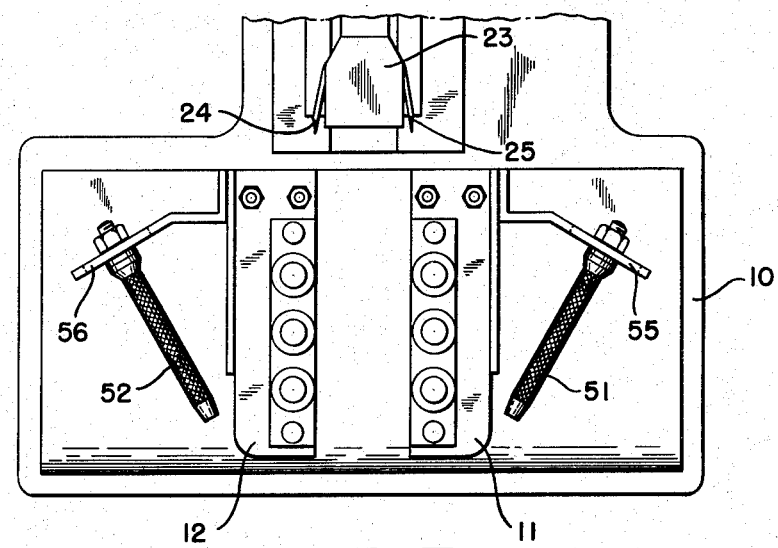
Figure 8:
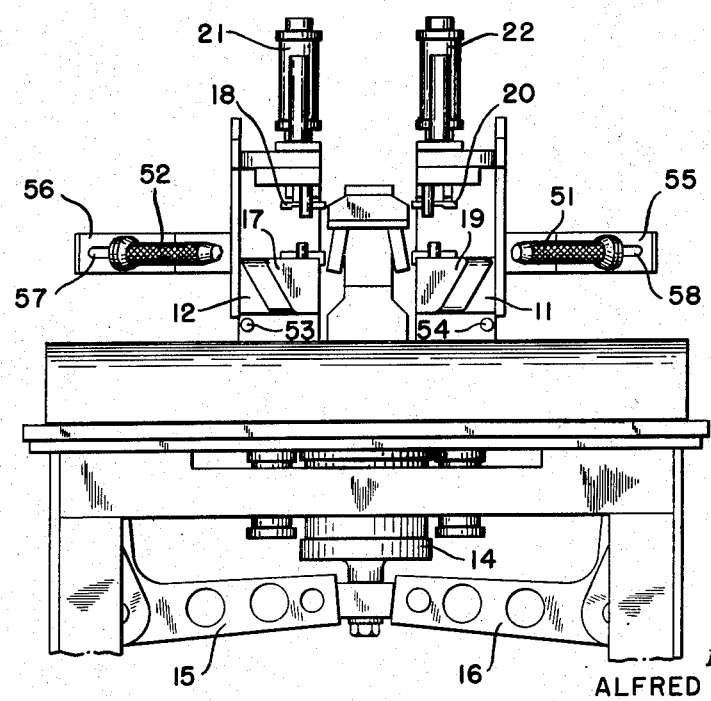
Figure 9:
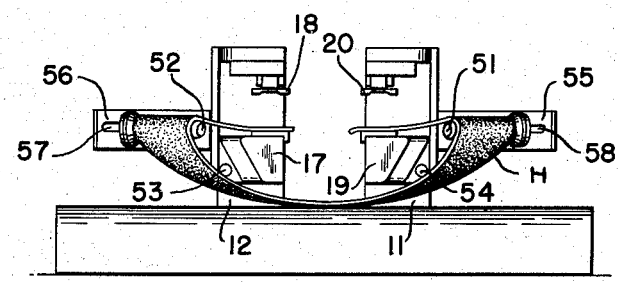
Figure 10:
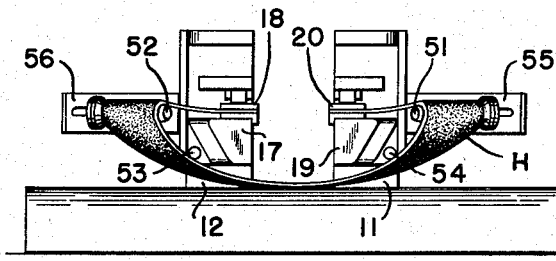
Figure 11:
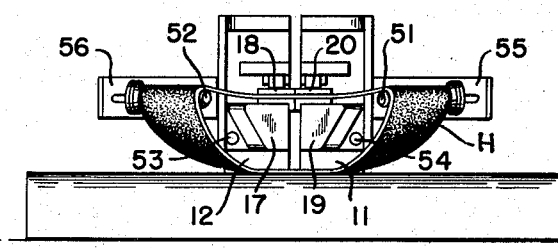
Figure 12:
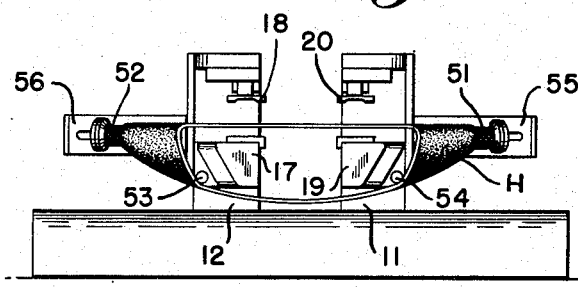
Figure 13:
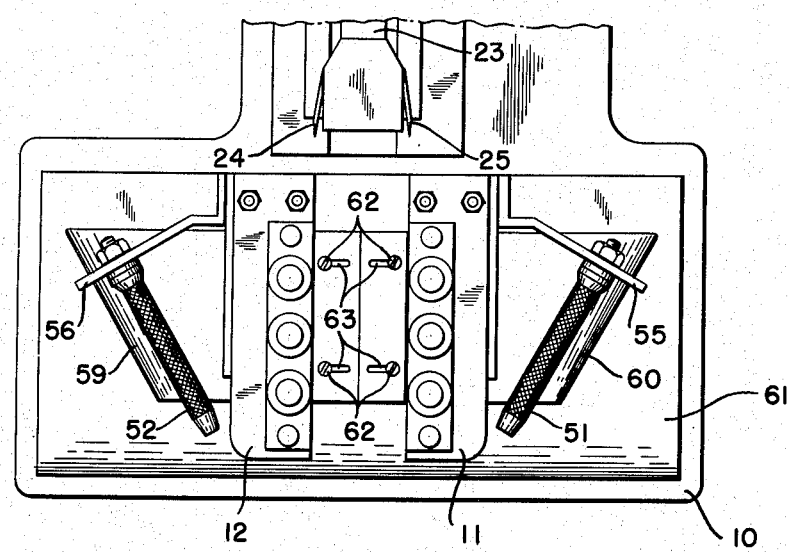
Figure 14:
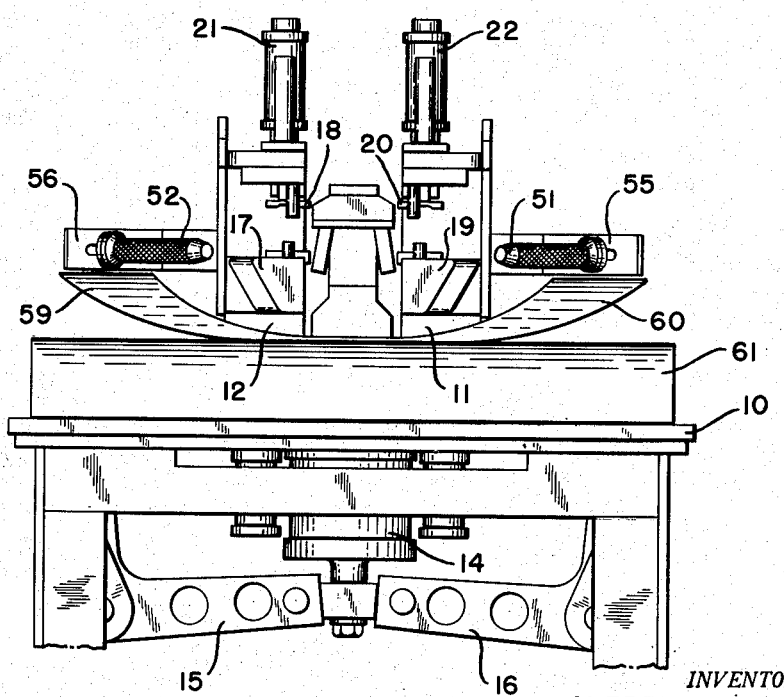
Figure 15:
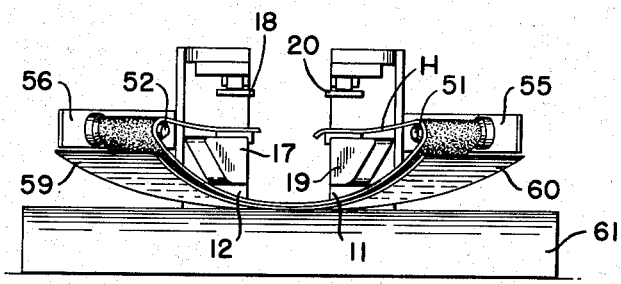
Figure 16:
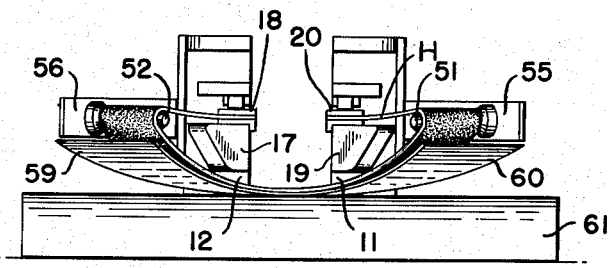
Figure 17:
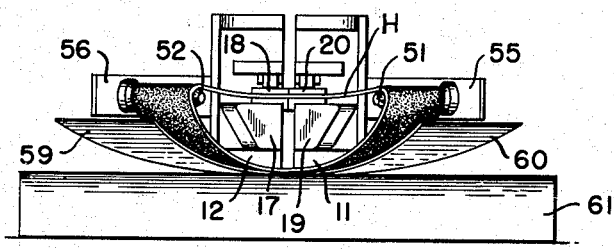
Figure 18:
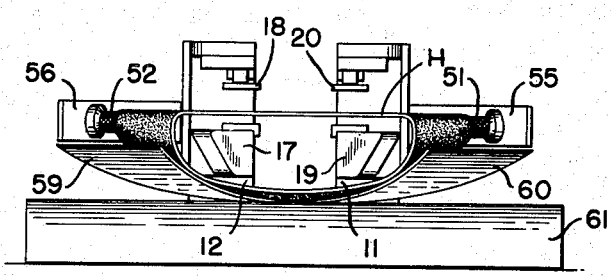

Other objects and advantages of the present invention will become apparent from reading the following description taken in conjunction with the accompanying drawings, wherein:

Fig. 1 is a partial plan view of a trimming and splicing machine incorporating the gaging points of the present invention; the gaging points being in the form of pins positioned to accommodate straight extruded tube stock, Fig. 2 is a partial front elevational view of the trimming and splicing machine of Fig. 1, Fig. 3 is a partial front elevational view similar to that of Fig. 2 showing a length of stock placed around the gage pins preparatory to closing the clamping jaws, Fig. 4 is a partial front elevational view similar to that of Fig. 3 showing the clamping jaws closed and the ends of the tube stock trimmed, Fig. 5 is a partial front elevational view similar to that of Fig. 4 showing the clamping jaws after they have been moved together to splice the ends of the tube stock, Fig. 6 is a partial front elevational view similar to that of Fig. 5 showing the clamping jaws released and the carriages retracted after the splice has been completed, Fig. 7 is another partial plan view of a trimming and splicing machine incorporating the gaging points of the present invention; the gaging points being in the form of pins positioned to accommodate helically extruded tube stock, Fig. 8 is a partial front elevational view of the trimming and splicing machine of Fig. 7, Fig. 9 is a partial front elevational view similar to that of Fig. 8 showing a length of helically extruded tube stock placed around the gage pins preparatory to closing the clamping jaws, Fig. 10 is a partial front elevational view similar to that of Fig. 9 showing the clamping jaws closed and the ends of the stock trimmed, Fig. 11 is a partial front elevational view similar to that of Fig. 10 showing the jaws after they have been moved together to splice the ends of the tube stock, Fig. 12 is a partial front elevational view similar to that of Fig. 11 showing the clamping jaws released and the carriages retracted after the splice has been completed, Fig. 13 is another partial plan view of a trimming and splicing machine incorporating the gaging means of the present invention; the gaging means being in the form of pins and a curved gaging surface positioned to accommodate helically extruded tube stock, Fig. 14 is a front elevational view of a trimming and splicing machine of Fig. 13, Fig. 15 is a front elevational view similar to that of Fig. 14 showing a length of helically extruded tube stock placed around the gage pins and in conformity with the carriages of a curved gage surface preparatory to closing the clamping jaws, Fig. 16 is a partial front elevational view similar to that of Fig. 15 showing the clamping jaws closed and the ends of the stock trimmed, Fig. 17 is a partial front elevational view similar to that of Fig. 16 showing the jaws after they have been moved together to splice the ends of the tube stock, Fig. 18 is a partial front elevational view similar to that of Fig. 17 showing the clamping jaws released and the carriages retracted after the splice has been completed, Fig. 19 is a front elevational view showing another type of trimming and splicing machine incorporating the gaging means of the present invention; the gaging means being in the form of gage pins and a curved gage surface positioned to accommodate a section of straight extruded tube stock, Fig. 20 is a side elevational view of the trimming and splicing machine of Fig. 19, Fig. 21 is a partial front elevational view similar to that of Fig. 19 showing a piece of tube stock placed around the gaging means preparatory to closing the clamping jaws, Fig. 22 is a partial front elevational view similar to that of Fig. 21 showing the clamping jaws closed and the ends of the tube stock trimmed, Fig. 23 is a partial front elevational view similar to that of Fig. 22 showing the jaws after they have been moved together to splice the ends of the tube stock, Fig. 24 is a partial front elevational view similar to that of Fig. 23 showing the clamping jaws released and the carriages retracted after the splice has been completed, Fig. 25 is a sectional view taken on the line XXV—XXV of Fig. 1 showing the details of the roller gage pins, ratchet mechanism, pivotal mounting and latching arrangement, Fig. 26 is a sectional view taken on the line XXVI—XXVI of Fig. 25 showing the details of the ratchet mechanism, and Fig. 27 is a sectional view showing a modification of the latching arrangement shown in Fig. 25 for use in conjunction with the machine of Fig. 19.

Referring to the drawings and in particular to Figs. 1 and 2 of the drawings, there is shown a trimming and splicing machine incorporating the improvements constituting the present invention. The particular machine disclosed is of the type shown in U. S. Patent No. 2,576,940 to Alfred N. Iknayan and Alfred B. Clayton and assigned to the same assignee as the present application, and reference is made to that patent for a detailed description of the construction of the machine.

Broadly the machine consists of a base 10 and two carriages 11 and 12 mounted for sliding movement toward and away from each other on ways 13 secured to the base 10. The carriages are moved by an air cylinder 14 through bell cranks 15 and 16. A pair of clamping jaws are mounted on the top of each carriage. A stationary clamping jaw 17 and a movable jaw 18 are mounted on carriage 12 and a stationary jaw 19 and a movable jaw 20 are mounted on the carriage 11. Jaw 18 is moved toward jaw 17 to clamp one end of a piece of inner tube stock therebetween by an air cylinder 21 and jaw 20 is moved toward jaw 19 to clamp the other end of a piece of stock therebetween by air cylinder 22.

A carriage 23 is mounted for movement horizontally between and at right angles to the carriages 11 and 12 and has secured thereto a pair of knives 24 and 25 for severing the ends of the stock projecting from the faces of the clamps mounted on the carriages 11 and 12.

The improvement constituting one modification of the present invention includes four spaced gage pins 26, 27, 28 and 29 as best shown in Fig. 2 around which a section of inner tube stock may be placed. Pins 26 and 27 are in the form of rollers as shown in detail in Fig. 25 and include a hollow sleeve 30 mounted for rotation in bearings 31 and 32 on a shaft 33. The sleeve 30 has a ratchet wheel 34 secured to one end and a tapered cap 35 threaded into the opposite end. The shaft 33 has a threaded end 36 by which it is secured to an arm 37. A pawl holder 38 is also threaded on end 36 and has secured thereto a spring pawl 39 (Fig. 27) which engages the teeth of the ratchet wheel 34 and allows the sleeve 30 to turn freely in one direction but prevents the sleeve from turning in the other direction. Arm 37 is secured to the end of a shaft 40 which is mounted for rotation in bearings carried by block 41. Pivotal movement of arm 37 relative to block 41 is normally prevented by a spring pressed latch pin 42 carried by the block 41, which engages a hole 43 in the arm 37. Pin 42 is urged toward latching position by compression spring 44.

Block 41 is slidably mounted on a slotted arm 45 (Fig. 2) secured to the carriage 11. The slotted arm 45 extends at right angles to the opposed faces of the clamping jaws 19 and 20. Block 41 is provided with a clamping screw 46 threaded into the top thereof, which engages the top of the arm 45 so that the block may be clamped at any desired point along the arm 45.

Pin 27 (Fig. 2) is similar to roller pin 26 and is mounted in a similar manner on a pivotal arm. The ratchet and pawl arrangement of pin 27, however, is arranged to allow the roller pin 27 to turn in a direction opposite to that in which the pin 26 turns.

Pins 28 and 29 may also be similar to pin 26 or they may be merely straight non-rotatable pins. These pins are not mounted on an arm but are secured directly to the carriages 11 and 12 beneath the clamps. As will later be brought out, it is possible to eliminate pins 28 and 29 and utilize as gage surfaces the bottom surfaces 17a and 19a of the jaws 17 and 19 which project from the machine.

The latch pin 42 of pin 26 is disengaged from the arm 37 so that the arm 37 is free to pivot when the carriage 11 is moved inwardly by a cam bar 47 having a tapered end (Fig. 2) which engages a tapered flange 48 (Fig. 25) secured to the pin 42 and forces the pin out of the hole 43 as the carriage 11 moves toward the center of the machine. The cam bar 47 is bifurcated and engages the flange 48 on either side of the pin 42. Cam bar 47 is adjustably secured to an upright member 49 which in turn is secured to the base 10. When the carriage 11 moves inwardly it carries the flange 48 against the cam bar 47 so that the latch pin 42 is disengaged from the arm 37. Pin 27 which is also mounted on a pivotally mounted arm is released in a similar manner as pin 26 by cam bar 50.

Referring to Figs. 3, 4, 5, and 6, there is shown the sequence of operations in trimming and splicing a piece of inner tube stock T in the machine of Figs. 1 and 2. In Fig. 3, the carriages 11 and 12 are in their retracted positions. The pins 26 and 27 are adjusted and clamped so that the combined distances between the pins 26, 27, 28 and 29 and the faces of the clamping jaws 17 and 19 is equal to the desired length to which the tube is to be trimmed.

A piece of inner tube stock T is placed in the machine around the gage pins 26, 27, 28 and 29 with the end portions thereof between the clamping jaws. The gage pins have a minimum length equal to the width of the tube section T so that the full width thereof is supported. The stock is pulled around the rollers until all slack is removed from the section. The ratchet mechanism of the gage pins 26 and 27 prevent the stock from slipping backwards. As can be seen in Fig. 1, the rollers are knurled to increase the friction between the roller pins and the tube. No special care need be taken in placing the stock in the machine and the end portions of the tube section may overlap the faces of the jaws unequally as shown in Fig. 3. After the stock T is placed in the machine, the clamping jaws are closed to clamp the end portions of the tube stock therebetween as shown in Fig. 4 and the trimming knives 24 and 25 are moved in between the clamping jaws to trim the end portions of the tube stock T flush with the opposed faces of the clamping jaws 17 and 19. As so trimmed, the tube section T is of the correct standard length.

As shown in Fig. 5, after the tube has been accurately trimmed to length, the carriages 11 and 12 are moved together to bring the freshly cut ends of the tube stock T into abutting engagement to form a splice. As the carriages are moved together, the flange 48 (Fig. 25) on the latch pin 42 of gage pin 26 is engaged by the cam bar 47 and pin 42 is thereby disengaged from the pivot arm 37 so that the arm 37 and the gage pin 26 secured thereto is free to pivot. In a similar manner the gage pin 27 is unlatched by the cam bar 50.

After the splice is completed, the clamping jaws are released and the carriages are retracted as shown in Fig. 6. As the carriages are retracted, the pins 26 and 27, being unlatched, pivot inwardly under the influence of the spliced tube so that the tube is not stretched. When the spliced tube is removed, the pins fall back by gravity to the position as shown in Fig. 3 and the arms 37 engaged by the latch pins to again lock them in this position preparatory to another sequence of operation.

If no pins 28 and 29 are provided, the bottom surfaces 17a and 19a of the jaws 17 and 19 may be utilized as gage surfaces by placing the tube section T in contact with these surfaces as shown by the dotted lines in Fig. 3. The sequence of operation is otherwise the same as above described.

The above-described embodiment of the invention is for use in trimming and splicing what is commonly known as a conventional or straight extruded tube. In Figs. 7 and 8 there is shown a modification of the present invention adapted to be used in trimming and splicing what is known as a helical tube. This name is used because the tube stock is formed as a helix having the general dimensions of the finished tube. Such a tube section is shown and described in United States Patent No. 2,423,147, to Hinman.

This modification as applied to the same machine as shown in Fig. 1, includes gage pins 51, 52, 53, and 54 as shown in Figs. 7 and 8 around which a section of inner tube stock is placed. The pins 51 and 52 are identical to pins 26 and 27 previously described, and includes identical ratchet mechanisms. Pins 53 and 54 are identical to pins 28 and 29 previously described. Pin 51 is secured directly to a bracket 55 which in turn is secured to the carriage 11 and pin 52 is secured directly to a bracket 56 secured to the carriage 12. The pins 53 and 54 are secured to carriages 11 and 12 respectively, beneath the clamping jaws 17 and 19. Slots as shown at 57 and 58 may be provided in the brackets 55 and 56 to provide for adjustment of the positions of the pins 51 and 52. As will be later brought out, no pivotal arm and latch arrangement is necessary in this embodiment of the invention.

The brackets 55 and 56 are bent forwardly as best seen in Fig. 7 so that the pins 51 and 52 extend at an angle to the opposed faces of the clamping jaws 17 and 19. The angle corresponds to the angle of the helical tube section to be trimmed and spliced.

Referring to Figs. 9, 10, 11, and 12, there is shown the sequence of operations in trimming and splicing a piece of helical tube stock H in the machine of Figs. 7 and 8. As in the modification of Figs. 1 and 2, the gage pins are adjusted so that the combined distances between them and the faces of the clamping jaws 17 and 19 is equal to the desired trim length of the tube section.

Referring to Fig. 9, the tube section H is placed around the gage pins 51, 52, 53 and 54 and pulled tight to remove all slack and the end portions thereof placed between the clamping jaws 17 and 18 and 19 and 20. The end portions are then clamped between the clamping jaws and trimmed flush with the faces of the jaws as shown in Fig. 10. The carriages 11 and 12 are then moved together to splice the freshly cut ends as shown in Fig. 11. When the splice is completed and the carriages 11 and 12 are retracted, the tube section H slips off the ends of the gage pins 51 and 52 because of the angle at which they extend as shown in Fig. 12, and whereby the spliced tube section is thereby prevented from being stretched when the carriages 11 and 12 are retracted.

Pins 53 and 54 may be eliminated and the bottom surfaces 17a and 19a of the jaws 17 and 19 may be used as gage surfaces in the manner previously described in conjunction with the modification of Figs. 1–6.

Referring to Figs. 13 and 14 there is shown a still further modification of the invention. This modification is similar to that shown in Figs. 7 and 8. In this modification however, the lower gage pins 53 and 54 of Figs. 7 and 8 are eliminated and two curved plates 59 and 60 are provided beneath the jaws 17 and 19. The degree of curvature of the plates is made to correspond to the curvature of the inner tube stock when it is draped around the gage pins.

The plates 59 and 60 are adjustably secured to a support 61 secured to the base 10 by means of bolts 62 which extend through slots 63 in the plates. By this arrangement the spacing between the plates 59 and 60 can be adjusted to accommodate various size tubes.

Referring to Figs. 15, 16, 17 and 18 there is shown the sequence of operations in trimming and splicing a piece of inner tube stock H in the machine of Figs. 13 and 14. In Fig. 15, the carriages are in their retracted position. The gage pins 51 and 52 and the gage plates 59 and 60 are adjusted so that the combined distances between them and the opposed faces of the clamping jaws 17 and 19 is equal to the desired length to which the tube is to be trimmed.

A piece of inner tube stock H is placed in the machine around the gage pins 51 and 52 with the end portions in the clamps 17 and 19. The stock is pulled around the gage pins until all slack is removed and the tube section conforms to the curvature of the plates 59 and 60. After the stock is placed in the machine, the clamping jaws are closed as shown in Fig. 16 to clamp the end portions of the tube stock therebetween and the trimming knives 24 and 25 are moved in between the clamping jaws to trim the end portions of the tube stock extending from the opposed faces of the clamping jaws. As so trimmed the tube section H is of the correct standard length.

As shown in Fig. 17 after the tube section has been accurately trimmed to length, the carriages are moved together to bring the freshly cut ends of the tube stock H ends into abutting engagement to form a splice.

After the splice is completed, the clamping jaws are released and the carriages retracted as shown in Fig. 18. As the carriages retract, the spliced tube section slip off the ends of the gage pins 51 and 52 in the manner as previously described in conjunction with the modification of Figs. 7-12.

Referring to Figs. 19 and 20, there is shown another embodiment of the present invention as applied to another type of conventional trimming and splicing machine. The particular splicing machine shown in Figs. 19 and 20 is of the type disclosed in U. S. Patent No. 2,024,577 to Haase, and reference is made thereto for details of the construction thereof.

Broadly, this machine consists of a base 62 and a pair of carriages 63 and 64 movable towards and away from each other on a dovetail bearing way 65 secured to the base 62. Carriage 64 has a stationary jaw 66 and a pivoted jaw 67 secured thereto. Pivoted jaw 67 is pivoted toward jaw 66 to clamp the end portion of a piece of inner tube stock by means of an air cylinder 68. Carriage 63 is provided with a similar stationary clamping jaw 69 and a pivoted clamping jaw 70 operated by an air cylinder (not shown) similar to air cylinder 68.

A pair of trimming knives 71 and 72 are mounted directly above the clamping jaws and are moved downwardly between the jaws by an air cylinder 73 to trim the end portions of a piece of stock extending from the faces of the jaws.

The improvement constituting a further modification of the present invention includes a pair of gage pins 74 and 75 similar to gage pins 26 and 27 previously described. The pins 74 and 75 are mounted on arms 76 and 77 respectively, which in turn are adjustably and pivotally mounted on brackets 78 and 79 respectively. Brackets 78 and 79 are attached to a stationary upright framework member 80 (Fig. 20) which also supports the air cylinder 73.

Cam bars 81 and 82 similar to cam bars 47 and 50 of Fig. 2 are mounted on carriages 63 and 64 respectively. In this embodiment as cam bars 81 and 82 rather than the pins 74 and 75 are mounted on the carriages, the latching arrangement is slightly modified as shown in Fig. 26. As can be seen by reference to this figure, a spring 44' similar to spring 44 of Fig. 25 is placed on the opposite side of the flange 48' from that shown in Fig. 25 so that the latch pin 42' is normally urged by the spring to an unlatched position. The cam bar 82 by engagement with the flange 48' forces the latch pin 42' into engagement with the pivotally mounted arms while the carriages 63 and 64 are in retracted positions. When the carriages are moved toward each other, carrying with them the cam bars 81 and 82, the latch pin 42' is released and is urged to non-latching position by the spring 44' so that the arms 76 and 77 are free to pivot in a similar manner as previously described in conjunction with the gage pin 26. The gage pins 74 and 75 and their mountings are otherwise the same as gage pin 26 and include a ratchet and pawl arrangement.

The ratchet and pawl arrangement for gage pin 74 is set to allow the pin to rotate only in a clockwise direction as viewed in Fig. 19 and the ratchet and pawl arrangement for gage pin 75 is set to allow the pin to rotate only in a counter-clockwise direction.

A shelf-like arcuate plate 83 is secured to the stationary vertical frame member 80 directly above and spaced from the clamping jaws. The plate 83 has a minimum width equal to the width of the stock to be trimmed.

Referring to Figs. 21, 22, 23 and 24, there is shown the sequence of operations in trimming a piece of stock T in the machine disclosed in Figs. 19 and 20. In Fig. 21 the carriages 63 and 64 are in their retracted position. Pins 74 and 75 have been adjusted and clamped so that the combined distance between the pins 74 and 75, the plate 83 and the opposed faces of the clamping jaws 66 and 69 is equal to the desired trim length of the tube section. In the retracted position of the carriages 63 and 64 the cam bars 81 and 82 engage the flange 48' of the latch pin 42' to hold it in locking engagement with the arms 76 and 77 so that the arms are held in the position shown in Figs. 19 and 21. The tube section T is placed around the pins 74 and 75 and over the plate 83 and the end portions thereof are placed between the clamping jaws 66 and 69. The end portions extending from the faces of the jaws are then clamped between the clamping jaws and trimmed flush with the face of the jaws as shown in Fig. 22.

The carriages 63 and 64 are then moved together to splice the freshly cut ends of the tube section T as shown in Fig. 24. As the carriages 63 and 64 move inwardly, the cam bars 81 and 82 which are attached thereto release the latching pins 42' so that the arms 76 and 77 and the gage pins 74 and 75 attached thereto may pivot inwardly under the influence of the tube section wrapped therearound as shown in Figs. 23 and 24 and thereby prevent stretching of the tube sections.

While the carriages are still together the clamping jaws are released and the tube removed from the machine. The pins 74 and 75 and the arms 76 and 77 then drop to the vertical position and the carriages are retracted so that the cam bars 81 and 82 again engage the latch pins 42' to force them into locking engagement with the arms 76 and 77, preparatory to another sequence of operations.

Having thus described our invention, what we claim and desire to protect by Letters Patent is:

1. A machine for trimming a piece of flexible stock to a predetermined length and splicing the ends together comprising, a pair of carriages movable toward and away from each other, a clamp mounted on each carriage for separately clamping each end portion of the stock with portions of the ends thereof extending from opposed faces of the clamps, severing means movable between the opposed faces of the clamps for trimming the ends of the stock extending from said opposed faces, a pin of substantial length secured to and extending from the machine on each side of said clamps remote from said opposed faces around which the stock is adapted to be placed, a member secured to and projecting from the machine in substantially the same direction as said pins at a point spaced from said pins which the stock is adapted to engage, the combined distances between said pins, said member, and the opposed faces of the clamps being of a predetermined length whereby when said stock is placed in said machine around said pins and in contact with said member and the ends thereof clamped in said clamps, said severing means will trim the stock to a predetermined length and when said carriages are moved together the trimmed ends of the stock will be forced into abutting engagement to thereby form a splice.

2. A machine for trimming a piece of flexible stock to a predetermined length and splicing the ends together comprising, a pair of carriages movable toward and away from each other, a clamp mounted on each carriage for separately clamping each end portion of the stock with portions of the ends thereof extending from opposed faces of the clamps, severing means movable between the opposed faces of the clamps for trimming the ends of the stock extending from said opposed faces, a pin of substantial length secured to and extending from the machine on opposite sides of said clamps remote from said opposed faces around which the stock is adapted to be placed, said pins extending from said machine at an angle towards each other, a member secured to and projecting from the machine in substantially the same direction as said pins at a point spaced from said pins, the combined distances between said pins, said member, and the opposed faces of the clamps being of a predetermined length whereby when said stock is placed in said machine around said pins and in contact with said member, and the ends thereof clamped in said clamps, said severing means will trim the stock to a predetermined length and when said carriages are moved together the trimmed ends of the stock will be forced into abutting engagement to thereby form a splice.

3. A machine for trimming a piece of flexible stock to a predetermined length and for splicing the ends of the stock together comprising, a pair of carriages movable toward and away from each other, a clamp mounted on each carriage for separately clamping each end portion of the stock with portions of the ends thereof extending from opposed faces of the clamps, severing means movable between the opposed faces of the clamps for trimming the ends of the stock extending from said opposed faces of the clamps, a roller of substantial length attached to and extending from said machine on each side of said clamps remote from said opposed faces around which the stock is adapted to be placed, means for allowing only unidirectional rotation of said rollers, a member secured to and projecting from the machine in substantially the same direction as said rollers at a point spaced from said rollers which the stock is adapted to engage, the combined distance between said rollers, said member, and the opposed faces of the clamps being of a predetermined length whereby when said stock is placed in said machine around said rollers, and in contact with said member and the ends thereof clamped in said clamps, said severing means will trim the stock to a predetermined length and when said carriages are moved together the trimmed ends of the stock will be forced into abutting engagement to thereby form a splice.

4. A machine for trimming a piece of flexible stock to a predetermined length and splicing the ends together comprising, a pair of carriages movable toward and away from each other, a clamp mounted on each carriage for separately clamping each end portion of the stock with portions of the ends thereof extending from opposed faces of the clamps, severing means movable between the opposed faces of the clamps for trimming the ends of the stock extending from said opposed faces of the clamps, a pin of substantial length attached to and extending from the machine on each side of said clamps remote from said opposed faces, means mounting said pins for movement in the direction of movement of the movable carriages, means for locking said pins in one position, means for disengaging said locking means when said carriages are moved towards each other to free said pins for movement in the same direction as said movable carriages, a member secured to and projecting from the machine in substantially the same direction as said pins at a point spaced from said pins, the combined distances between said pins, said member, and the opposed faces of the clamps being of a predetermined length whereby when said stock is placed in said machine around said pins and in contact with said member and the ends thereof clamped in said clamps said severing means will trim the stock to a predetermined length and when said carriages are moved together the trimmed ends of the stock will be forced into abutting engagement to thereby form a splice.

5. A machine for trimming a piece of flexible stock to a predetermined length and splicing the ends together comprising, a pair of carriages movable towards and away from each other, a clamp mounted on each carriage for separately clamping each end portion of the stock with portions of the ends thereof extending from opposed faces of the clamps, severing means movable between the opposed faces of the clamps for trimming the ends of the stock extending from said opposed faces of the clamps, an arm pivotally attached to the machine on each side of said clamps remote from said opposed faces of the clamps, a pin of substantial length secured to the free end of each arm and extending therefrom around which the stock is adapted to be placed, means for locking said arms against pivotal movement, means for disconnecting said locking means when said carriages are moved together to free said arms for pivotal movement, a member secured to and projecting from the machine in substantially the same direction as said pins at a point spaced from said pins, the combined distance between said pins, said member, and the opposed faces of the clamps when the carriages are spaced apart being of a predetermined length whereby when said stock is placed in said machine around said pins, and in contact with said member and the ends thereof clamped in said clamps, said severing means will trim the stock to a predetermined length and when said carriages are moved together the trimmed ends of the stock will be forced into abutting engagement to thereby form a splice.

6. A machine for trimming a piece of flexible stock to a predetermined length comprising, a pair of carriages movable toward and away from each other, a clamp mounted on each carriage for separately clamping the end portions of the stock with portions of the ends thereof extending from opposed faces of the clamps, severing means movable between the opposed faces of the clamps for trimming the ends of the stock extending from said opposed faces, an arm pivotally attached at one end to each carriage on each side of said clamps remote from said opposed faces, a pin of substantial length secured to the free end of each arm and extending therefrom around which the stock is adapted to be placed, means for locking said arms against pivotal movement, means for disconnecting said locking means when said carriages are moved together to free said arms for pivotal movement, a member secured to and projecting from the machine in substantially the same direction as said pins at a point spaced from said pins, the combined distances between said pins, said member, and the opposed faces of the clamps when the carriages are spaced apart being of a predetermined length whereby when said stock is placed in said machine around said pins, and in contact with said member, and the ends thereof clamped in said clamps, said severing means will trim the stock to a predetermined length and when said carriages are moved together the trimmed ends of the stock will be forced into abutting engagement to thereby form a splice.

ALFRED B. CLAYTON.
THOMAS O. HALE.

References Cited in the file of this patent

UNITED STATES PATENTS

| Number | Name | Date |
|---|---|---|
| 1,230,319 | Paulson et al. | June 19, 1917 |
| 1,920,258 | Hardenbrook | Aug. 1, 1933 |
| 2,024,577 | Haase | Dec. 17, 1935 |
| 2,072,106 | Fitzsimmons | Mar. 2, 1937 |
| 2,118,278 | Tucker | May 24, 1938 |
| 2,201,135 | Evans | May 21, 1940 |
| 2,254,596 | Breth et al. | Sept. 2, 1941 |
| 2,273,463 | Campbell et al. | Feb. 17, 1942 |
| 2,516,602 | Snyder | July 25, 1950 |